(12) United States Patent
Tsunokawa

(10) Patent No.: US 9,965,463 B2
(45) Date of Patent: May 8, 2018

(54) INFORMATION PROCESSING APPARATUS AND INFORMATION PROCESSING METHOD

(71) Applicant: SONY CORPORATION, Tokyo (JP)

(72) Inventor: Motoki Tsunokawa, Chiba (JP)

(73) Assignee: SONY CORPORATION, Tokyo (JP)

( * ) Notice: Subject to any disclaimer, the term of this patent is extended or adjusted under 35 U.S.C. 154(b) by 0 days. days.

(21) Appl. No.: 15/109,841

(22) PCT Filed: Oct. 27, 2014

(86) PCT No.: PCT/JP2014/078524
§ 371 (c)(1),
(2) Date: Jul. 6, 2016

(87) PCT Pub. No.: WO2015/107741
PCT Pub. Date: Jul. 23, 2015

(65) Prior Publication Data
US 2016/0328379 A1   Nov. 10, 2016

(30) Foreign Application Priority Data

Jan. 15, 2014   (JP) ................................. 2014-005022

(51) Int. Cl.
*G06F 17/30* (2006.01)
*G06F 17/28* (2006.01)
(Continued)

(52) U.S. Cl.
CPC ........ *G06F 17/279* (2013.01); *G06F 17/2705* (2013.01); *G06F 17/2755* (2013.01); *G06F 17/30026* (2013.01); *G06F 17/30758* (2013.01)

(58) Field of Classification Search
CPC ......... G10L 21/00; G10L 15/18; G10L 15/26; G06F 17/28; G06F 17/30
(Continued)

(56) References Cited

U.S. PATENT DOCUMENTS 6,490,560 B1 * 12/2002 Ramaswamy .......... G10L 17/10
704/231
7,461,344 B2 * 12/2008 Young ..................... G06F 3/011
704/275
(Continued)

FOREIGN PATENT DOCUMENTS

JP   2000-268042 A   9/2000
JP   2002-132812 A   5/2002
(Continued)

*Primary Examiner* — Seong Ah A Shin
(74) *Attorney, Agent, or Firm* — Chip Law Group

(57) ABSTRACT

An information processing apparatus includes: an intention understanding unit configured to understand intention of a question inputted from a user; and an information extracting unit configured to extract response basic information which is a response to the question understood by the intention understanding unit and response addition information having relationship with the response basic information from a plurality of pieces of knowledge information including knowledge information relating to the user. Each piece of knowledge information includes a plurality of information elements and relationship information indicating relationship among the plurality of information elements. The information extracting unit extracts the response addition information from a group of information elements having relationship with an information element extracted as the response basic information and an information element included in the knowledge information relating to the user, directly or via one or more information elements.

10 Claims, 11 Drawing Sheets

(51) Int. Cl.
*G10L 21/00* (2013.01)
*G10L 15/26* (2006.01)
*G06F 17/27* (2006.01)

(58) Field of Classification Search
USPC .................................. 704/9, 224, 235, 257
See application file for complete search history.

(56) References Cited

U.S. PATENT DOCUMENTS

| | | | | |
|---|---|---|---|---|
| 2003/0046072 A1* | 3/2003 | Ramaswamy | ...... | G06F 17/2881 704/240 |
| 2010/0005061 A1* | 1/2010 | Basco | ................ | G06F 17/3071 704/9 |
| 2012/0016678 A1* | 1/2012 | Gruber | ............... | G06F 17/3087 704/275 |
| 2014/0074454 A1* | 3/2014 | Brown | ................. | G06F 19/345 704/9 |
| 2014/0195230 A1* | 7/2014 | Han | ...................... | G10L 15/22 704/235 |
| 2014/0272821 A1* | 9/2014 | Pitschel | ................. | G09B 19/06 434/157 |
| 2014/0365209 A1* | 12/2014 | Evermann | ............. | G06F 17/279 704/9 |
| 2015/0066479 A1* | 3/2015 | Pasupalak | ............... | G06F 17/27 704/9 |
| 2015/0106079 A1* | 4/2015 | Bostick | ............... | G06F 17/2775 704/9 |
| 2015/0112759 A1* | 4/2015 | Hong | ..................... | G06F 17/30 705/7.29 |
| 2016/0098988 A1* | 4/2016 | Goussard | ................ | G10L 15/18 704/257 |
| 2016/0203123 A1* | 7/2016 | Kozloski | ............. | G06F 17/2785 704/224 |

FOREIGN PATENT DOCUMENTS

| | | |
|---|---|---|
| JP | 2003-228580 A | 8/2003 |
| JP | 2004-318381 A | 11/2004 |
| JP | 2008-204133 A | 9/2008 |
| JP | 2009-157951 A | 7/2009 |

\* cited by examiner

FIG. 1
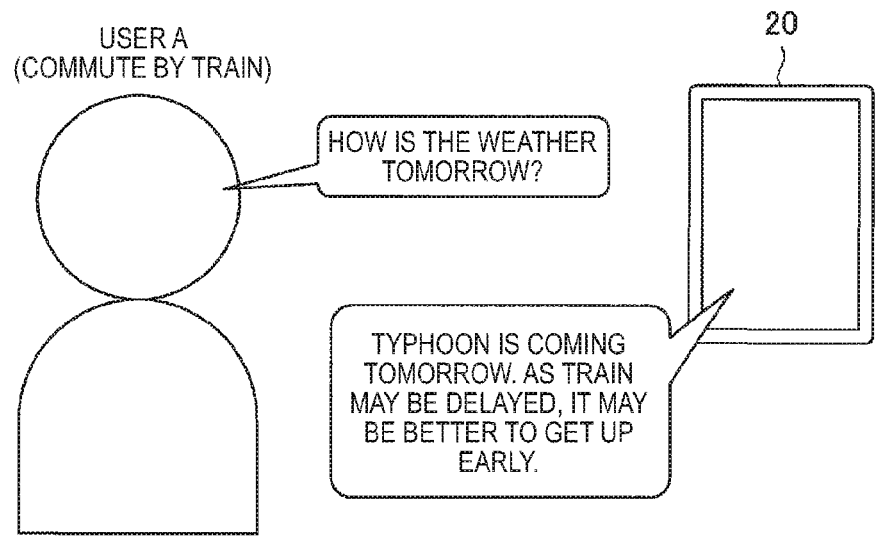
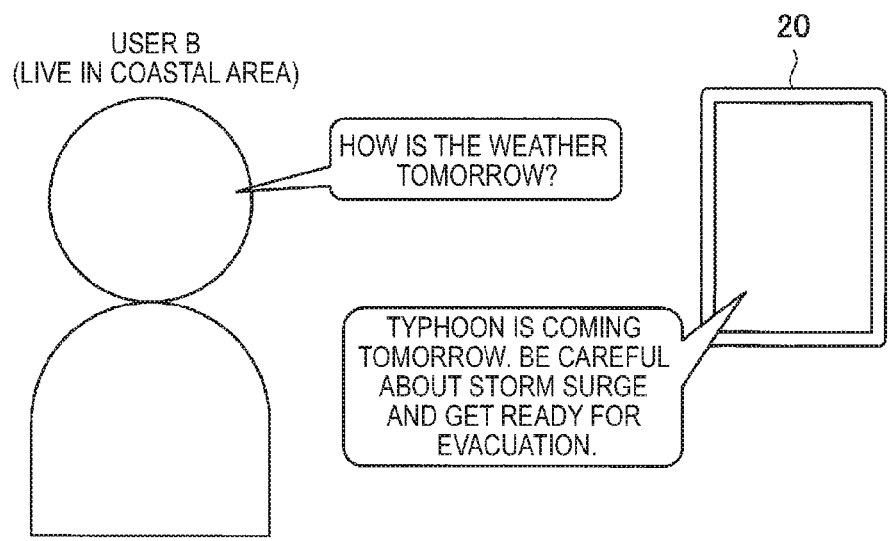

FIG. 3

| INFORMATION TYPE | INFORMATION EXAMPLE |
|---|---|
| COMMON KNOWLEDGE INFORMATION | NAGANO IS-A PLACE NAME (NAGANO IS PLACE NAME)<br>TYPHOON CAUSE TRAIN DELAY (TYPHOON CAUSES TRAIN DELAY)<br>TRAIN DELAY IS-A NEGATIVE (TRAIN DELAY IS NEGATIVE) |
| USER INFORMATION | USER A AT-LOCATION NAGANO (USER A LIVES IN NAGANO)<br>USER A USE TRAIN (USER A USES TRAIN) |
| DYNAMIC INFORMATION | 8/5 NAGANO WEATHER TYPHOON<br>(WEATHER IN NAGANO IN 8/5 IS TYPHOON) |
| CONTEXT INFORMATION | DATE OF TODAY IS-A 8/4 (DATE OF TODAY IS 8/4) |

FIG. 5

INTENTION STRUCTURE OF "HOW IS THE WEATHER TOMORROW?"

| INTENTION | PRESENTATION OF INFORMATION | |
|---|---|---|
| DOMAIN | WEATHER | |
| SLOT | WHEN | 8/5 (TOMORROW) |
| | WHERE | NAGANO (WHERE USER A LIVES) |

FIG. 6

| SENSOR TYPE | INFORMATION EXAMPLE |
|---|---|
| GPS | USER A AT-PRESENT-LOCATION NORTH LATITUDE 35. 68<br>USER A AT-PRESENT-LOCATION EAST LONGITUDE 135.77<br>(USER A IS CURRENTLY LOCATED AT NORTH LATITUDE OF 35.68 DEGREES AND EAST LONGITUDE OF 135.77 DEGREES) |
| TEMPERATURE SENSOR | USER A TEMPERATURE 33°C (TEMPERATURE AROUND USER A IS 33°C) |
| HUMIDITY SENSOR | USER A HUMIDITY 80% (HUMIDITY AROUND USER A IS 80%) |

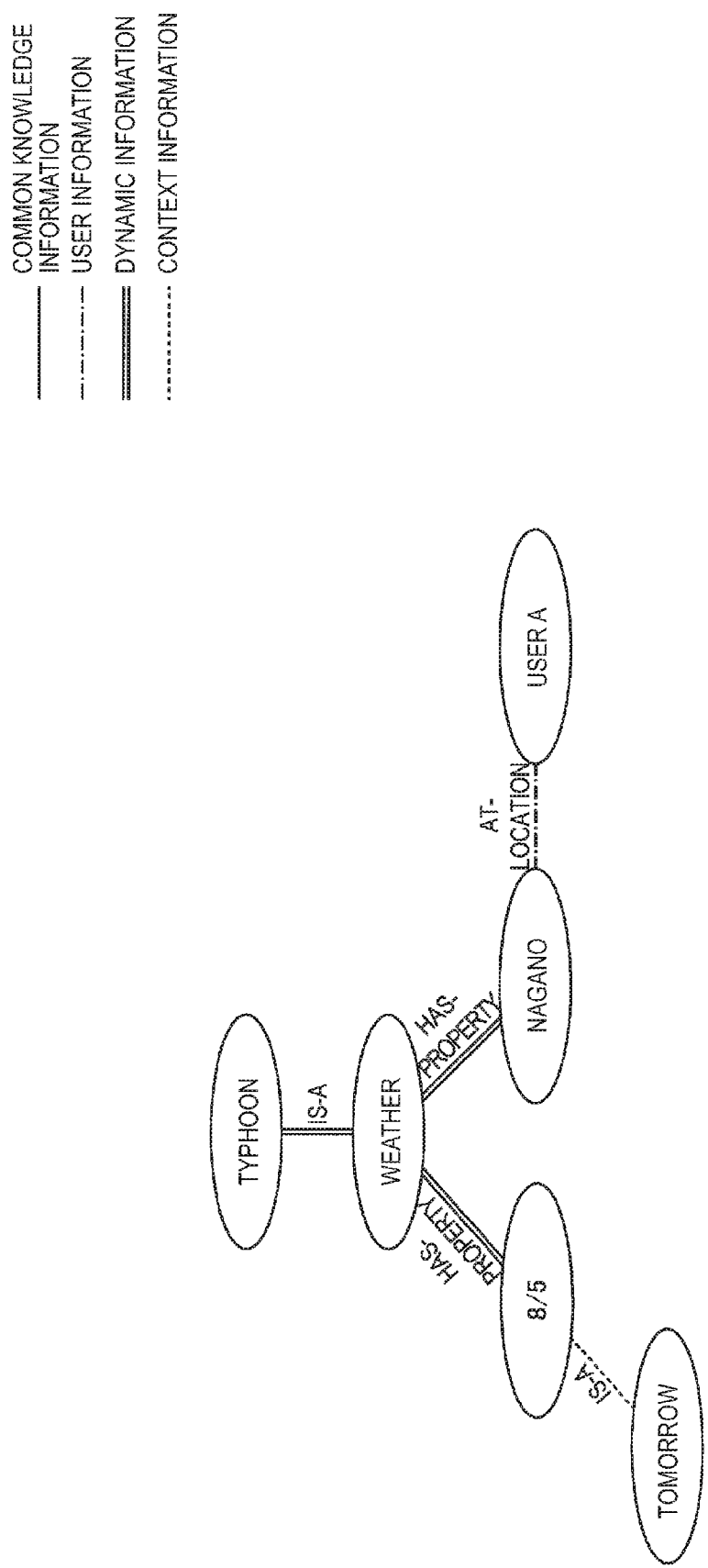

FIG. 11

INTENTION STRUCTURE OF "WHAT IS THE SCHEDULE FOR TOMORROW?"

| INTENTION | PRESENTATION OF INFORMATION | |
|---|---|---|
| DOMAIN | SCHEDULE | |
| SLOT | WHEN | TOMORROW (8/5) |

INFORMATION PROCESSING APPARATUS AND INFORMATION PROCESSING METHOD

CROSS REFERENCE TO RELATED APPLICATIONS

This application is a U.S. National Phase of International Patent Application No. PCT/JP2014/078524 filed on Oct. 27, 2014, which claims priority benefit of Japanese Patent Application No. JP 2014-005022 filed in the Japan Patent Office on Jan. 15, 2014. Each of the above-referenced applications is hereby incorporated herein by reference in its entirety.

TECHNICAL FIELD

The present disclosure relates to an information processing apparatus, an information processing method and a program.

BACKGROUND ART

Recently, an information processing apparatus provided with an interactive type user assistance function which is intended to assist a user becomes popular. When such an information processing apparatus receives a question from the user, the information processing apparatus automatically generates a response to the question from the user and responds to the user. For example, when the user asks "how is the weather tomorrow?", the information processing apparatus outputs sound of "a typhoon is coming". It should be noted that a system for assisting a user is also disclosed in, for example, Patent Literature 1.

CITATION LIST

Patent Literature

Patent Literature 1: JP 2009-157951A

SUMMARY OF INVENTION

Technical Problem

However, with a user assistance function for responding only to a question from a user, for example, there is a case where the user needs to ask additional questions in response to the response, which is troublesome and not sufficiently satisfactory for the user.

Therefore, the present disclosure proposes a new and improved information processing apparatus, information processing method and program which can increase user satisfaction for a response to a question.

Solution to Problem

According to the present disclosure, there is provided an information processing apparatus including: an intention understanding unit configured to understand intention of a question inputted from a user; and an information extracting unit configured to extract response basic information which is a response to the question understood by the intention understanding unit and response addition information having relationship with the response basic information from a plurality of pieces of knowledge information including knowledge information relating to the user. Each piece of knowledge information includes a plurality of information elements and relationship information indicating relationship among the plurality of information elements. The information extracting unit extracts the response addition information from a group of information elements having relationship with an information element extracted as the response basic information and an information element included in the knowledge information relating to the user, directly or via one or more information elements.

According to the present disclosure, there is provided an information processing method including: understanding intention of a question inputted from a user; and extracting response basic information which is a response to the understood question and response addition information having relationship with the response basic information from a plurality of pieces of knowledge information including knowledge information relating to the user by a processor. Each piece of knowledge information includes a plurality of information elements and relationship information indicating relationship among the plurality of information elements. Extraction of the response addition information includes extraction of the response addition information from a group of information elements having relationship with an information element extracted as the response basic information and an information element included in the knowledge information relating to the user, directly or via one or more information elements.

According to the present disclosure, there is provided a program causing a computer to function as an information processing apparatus including: an intention understanding unit configured to understand intention of a question inputted from a user; and an information extracting unit configured to extract response basic information which is a response to the question understood by the intention understanding unit and response addition information having relationship with the response basic information from a plurality of pieces of knowledge information including knowledge information relating to the user. Each piece of knowledge information includes a plurality of information elements and relationship information indicating relationship among the plurality of information elements. The information extracting unit extracts the response addition information from a group of information elements having relationship with an information element extracted as the response basic information and an information element included in the knowledge information relating to the user, directly or via one or more information elements.

Advantageous Effects of Invention

As described above, according to the present disclosure, it is possible to increase user satisfaction for a response to a question. Note that the effects described above are not necessarily limited, and along with or instead of the effects, any effect that is desired to be introduced in the present specification or other effects that can be expected from the present specification may be exhibited.

BRIEF DESCRIPTION OF DRAWINGS

FIG. 1 is an explanatory diagram illustrating outline of a user assistance function according to an embodiment of the present disclosure.

FIG. 3 is an explanatory diagram illustrating a specific example of knowledge information according to an embodiment of the present disclosure.

FIG. 5 is an explanatory diagram illustrating a specific example of an intention structure according to an embodiment of the present disclosure.

FIG. 6 is an explanatory diagram illustrating a specific example of sensor information according to an embodiment of the present disclosure.

FIG. 7 is an explanatory diagram illustrating generation process of a graph structure according to an embodiment of the present disclosure.

FIG. 11 is an explanatory diagram illustrating an intention structure of a question of "what is the schedule for tomorrow?" obtained by an intention understanding unit according to an embodiment of the present disclosure.

DESCRIPTION OF EMBODIMENT

Figure 2:
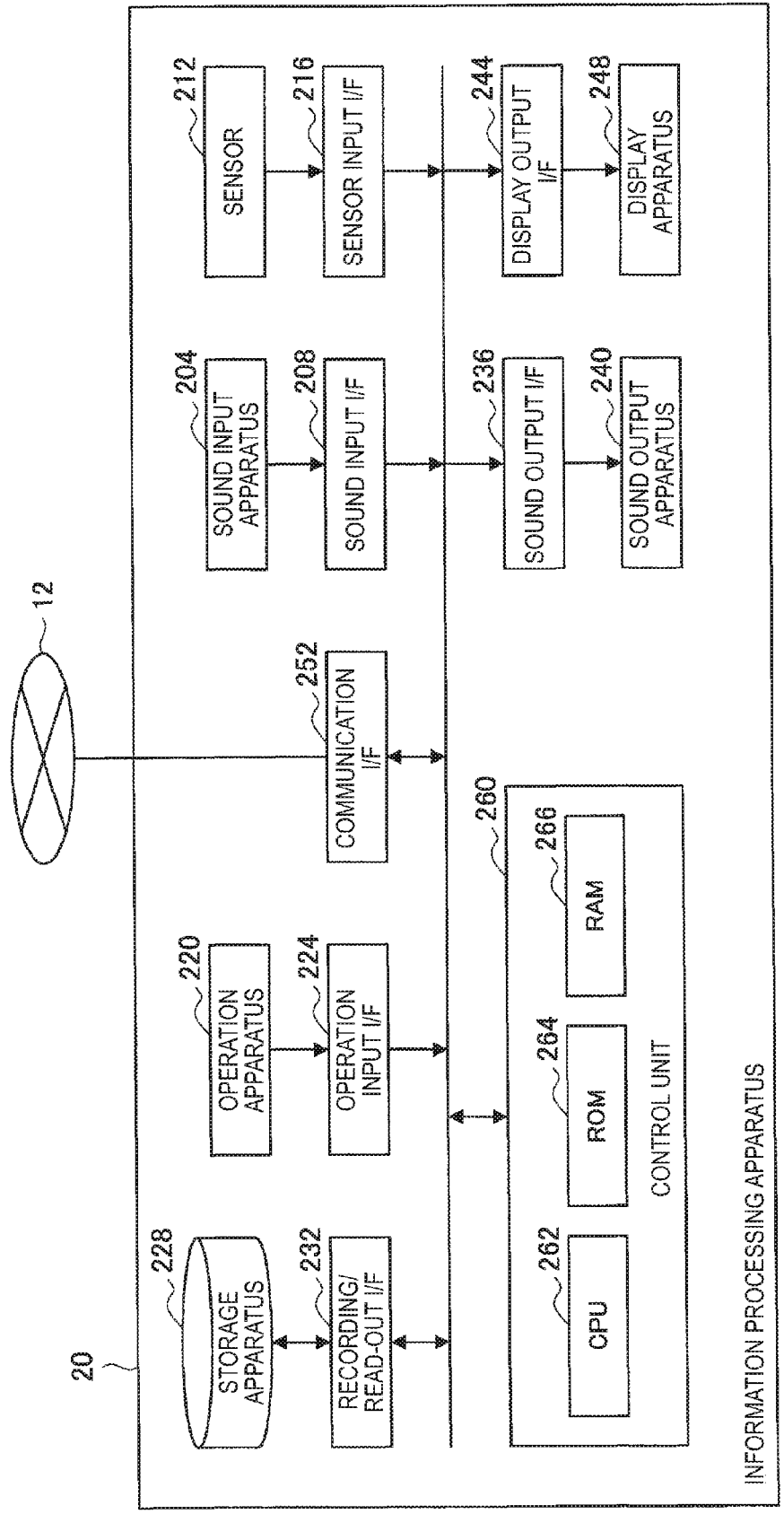
FIG. 2 is an explanatory diagram illustrating a hardware configuration of an information processing apparatus according to an embodiment of the present disclosure.

Hereinafter, a preferred embodiment of the present disclosure will be described in detail with reference to the appended drawings. In this specification and the drawings, elements that have substantially the same function and structure are denoted with the same reference signs, and repeated explanation is omitted.

Note that, in this description and the drawings, structural elements that have substantially the same function and structure are sometimes distinguished from each other using different alphabets after the same reference sign. However, when there is no need in particular to distinguish structural elements that have substantially the same function and structure, the same reference sign alone is attached.

Further, the present disclosure will be described according to the following item order.
1. Outline of User Assistance Function
2. Configuration of Information Processing Apparatus
3. Function of Information Processing Apparatus
4. Operation of Information Processing Apparatus
5. Application Example
6. Conclusion 1. Outline of User Assistance Function Recently, various user assistance functions become popular. For example, attention is focused on an interactive type user assistance function of automatically generating a response to a question from a user and responding to the user. However, because, with a function of responding only to a question from the user, there is a case where the user needs to ask additional questions in response to the response, which is troublesome, or a case where the user does not notice that the user should have asked additional questions and is in trouble later, it is not sufficiently satisfactory for the user.

On the other hand, a function of also providing other information in addition to a response to a question from the user will mitigate the above concerns to some extent. For example, when, in response to a question from the user of "how is the weather tomorrow?", the user assistance function provides additional information of "people living in a coastal area should be careful about storm surge and get ready for evacuation" in addition to a response of "a typhoon is coming", users living in the coastal area can escape from damage of storm surge by evacuating in advance.

However, beneficial additional information is not always the same for all the users. For example, while the above-described additional information is beneficial for users living in the coastal area, it cannot be said that the above information is beneficial for users living in an inland area. Therefore, it is desirable to further improve the user assistance function which provides a response of uniform additional information in addition to a response.

Therefore, an information processing apparatus according to an embodiment of the present disclosure has been made in view of the above-described circumstances. When the information processing apparatus according to the embodiment of the present disclosure receives a question from a user, the information processing apparatus can provide a response of information tailored to the user in addition to a response to the question. This will be described more specifically with reference to FIG. 1.

FIG. 1 is an explanatory diagram illustrating outline of a user assistance function according to the embodiment of the present disclosure. As illustrated in FIG. 1, in response to a question of "how is the weather tomorrow?" from a user A who commutes to work by train, the information processing apparatus 20 according to the embodiment of the present disclosure can provide a response of "as the train may be delayed, it may be better to get up early" in addition to a response of "a typhoon is coming tomorrow". Meanwhile, in response to a question of "how is the weather tomorrow?" from a user B who lives in the coastal area, the information processing apparatus 20 according to the embodiment of the present disclosure can provide a response of information of "be careful about storm surge and get ready for evacuation" in addition to a response of "a typhoon is coming tomorrow".

As described above, because the information processing apparatus 20 according to the embodiment of the present disclosure provides a response of information tailored to the user in addition to a response in response to a question from the user, it is highly likely to be able to provide beneficial information for the user. Therefore, the information processing apparatus 20 according to the embodiment of the present disclosure can further increase user satisfaction for a response to a question. A configuration, a function and operation of such an information processing apparatus 20 according to the embodiment of the present disclosure will be sequentially described in detail below.

2. Configuration of Information Processing Apparatus

The information processing apparatus 20 according to the embodiment of the present disclosure includes hardware for implementing the above-described user assistance function in cooperation with software. A hardware configuration of the information processing apparatus 20 will be specifically described below with reference to FIG. 2. It should be noted that, while FIG. 1 illustrates a mobile terminal as one example of the information processing apparatus 20, the information processing apparatus 20 may be a personal computer (PC), a home video processing apparatus (such as a DVD recorder and a video cassette recorder), a personal digital assistance (PDA), home video game machine, electrical household appliance, a smartphone, a mobile phone, a PHS, a mobile music playback apparatus, a mobile video processing apparatus, mobile game machine, or the like.

FIG. 2 is an explanatory diagram illustrating a hardware configuration of the information processing apparatus 20 according to the embodiment of the present disclosure. As illustrated in FIG. 2, the information processing apparatus 20 according to the embodiment of the present disclosure includes a sound input apparatus 204, a sound input interface 208, a sensor 212, a sensor input interface 216, an operation apparatus 220, an operation input interface 224, a storage apparatus 228, a recording/read-out interface 232, a sound output interface 236, a sound output apparatus 240, a display output interface 244, a display apparatus 248, a communication interface 252 and a control unit 260.

The sound input apparatus 204 is an apparatus for receiving sound input from the user. The sound input apparatus 204 may be a microphone which converts sound emitted by the user into an electrical signal. When the sound of the user is inputted to the sound input apparatus 204, the sound converted into an electrical signal is outputted to the control unit 260 via the sound input interface 208.

The sensor 212 detects an environment in which the information processing apparatus 20 or the user of the information processing apparatus 20 is located. For example, the sensor 212 may include a global positioning system (GPS) for detecting a location, a temperature sensor for detecting a temperature, a humidity sensor for detecting humidity, or the like. A sensor value obtained by the sensor 212 is outputted to the control unit 260 via the sensor input interface 216.

The operation apparatus 220 is an apparatus for detecting operation by the user. The operation apparatus 220 may be an input apparatus such as a touch panel, a keyboard, a mouse and a button. When the operation apparatus 220 detects operation by the user, an input signal according to the operation is outputted from the operation input interface 224 to the control unit 260.

The storage apparatus 228 stores various information used for operation of the information processing apparatus 20. Particularly, the storage apparatus 228 according to the present embodiment stores a plurality of pieces of knowledge information used for implementing a user assistance function. The knowledge information includes at least any of common knowledge information, user information relating to a user, context information indicating an environment in which the user is located, and dynamic information indicating an event in the world. A specific examples of these knowledge information will be described below with reference to FIG. 3.

FIG. 3 is an explanatory diagram illustrating a specific example of the knowledge information. As illustrated in FIG. 3, each piece of knowledge information includes a plurality of information elements and relationship information indicating relationship among the plurality of information elements. For example, common knowledge information meaning "Nagano is a place name" is constituted with an information element of "Nagano", an information element of "place name" and relationship information "IS-A" indicating that "Nagano" has equivalence relationship with "place name". Further, user information meaning "user A lives in Nagano" is constituted with an information element "user A", an information element of "Nagano" and relationship information "AT-LOCATION" indicating that "Nagano" is a place where "user A" is located.

Among the above-described knowledge information, the common knowledge information and the dynamic information can be acquired from a communication network 12 via the communication interface 252. Further, the user information can be inputted by, for example, the user operating the operation apparatus 220. Further, the context information can be held as system information of the information processing apparatus 20.

It should be noted that the storage apparatus 228 in which various information including the above-described knowledge information is stored may be a hard disc drive. Further, recording of information in the storage apparatus 228 and read-out of information from the storage apparatus 228 are performed by the recording/read-out interface 232.

A sound signal is supplied to the sound output apparatus 240 via the sound output interface 236, and the sound output apparatus 240 converts the supplied sound signal into sound and outputs the sound. The sound output apparatus 240 may be a speaker, earphones or a headphone.

A video signal is supplied to the display apparatus 248 via the display output interface 244, and the display apparatus 248 displays a video based on the supplied video signal. The display apparatus 248 may be a liquid crystal display apparatus or an organic electroluminescent display apparatus.

The communication interface 252 is an interface for performing communication with the communication network 12. The communication interface 252 may be a wired communication interface or a wireless communication interface. It should be noted that the communication network 12 is a wired or wireless transmission path for information transmitted from an apparatus connected to the communication network 12. For example, the communication network 12 may include a public line network such as the Internet, a phone line network and a satellite communication network, various local area networks (LAN) including Ethernet (registered trademark) and a wide area network (WAN). Further, the communication network 12 may include a dedicated line network such as an Internet protocol-virtual private network (IP-VPN).

As illustrated in FIG. 2, the control unit 260 has a central processing unit (CPU) 262, a read only memory (ROM) 264 and a random access memory (RAM) 266. The CPU 262 which functions as an arithmetic processing unit and a control apparatus, controls the whole operation within the information processing apparatus 20 according to various programs. This CPU 262 may be a microprocessor. The ROM 264 stores a program, an operation parameter, or the like, used by the CPU 262. The RAM 266 temporarily stores a program used for execution of the CPU 262, a parameter which changes as appropriate in the execution, or the like. The user assistance function according to the embodiment of the present disclosure is mainly provided by this control unit 260.

3. Function of Information Processing Apparatus

The hardware configuration of the information processing apparatus 20 according to the embodiment of the present disclosure has been described above. Subsequently, functions implemented by the above-described control unit 260 of the information processing apparatus 20 will be described in detail with reference to FIG. 4.

Figure 4:
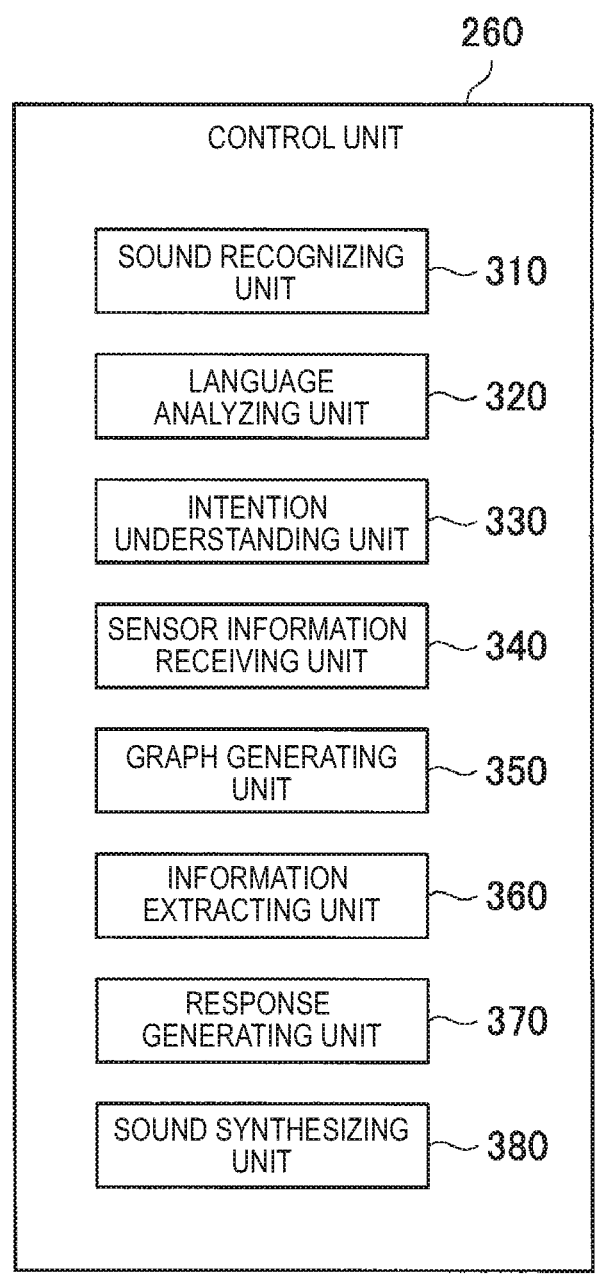
FIG. 4 is a functional block diagram illustrating functions implemented by a control unit according to an embodiment of the present disclosure.

FIG. 4 is a functional block diagram illustrating functions implemented by the control unit 260. As illustrated in FIG. 4, the control unit 260 has functions as a sound recognizing unit 310, a language analyzing unit 320, an intention understanding unit 330, a sensor information receiving unit 340, a graph generating unit 350, an information extracting unit 360, a response generating unit 370 and a sound synthesizing unit 380.

The sound recognizing unit 310 performs sound recognition based on a sound signal of the user and converts the sound signal of the user into text. For example, text of "how is the weather tomorrow" is obtained by the sound recognizing unit 310. The text obtained by the sound recognizing unit 310 is inputted to the language analyzing unit 320.

The language analyzing unit 320 receives the text obtained by the sound recognizing unit 310 as input and performs morphological analysis and parsing on the text, thereby determining spacing, a word class of each morpheme, modification, or the like. For example, the language analyzing unit 320 divides the text of "how is the weather tomorrow" into "how/is/the weather/tomorrow", determines whether each morpheme is a noun, a particle, or a verb and determines modification. By this means, it is possible to obtain a result of analysis of "how is the weather tomorrow?" The result of analysis by the language analyzing unit 320 is inputted to the intention understanding unit 330.

The intention understanding unit 330 receives the result of analysis obtained by the language analyzing unit 320 as input and understands intention using the result of analysis to thereby generate an intention structure. This will be specifically described below with reference to FIG. 5.

FIG. 5 is an explanatory diagram illustrating a specific example of the intention structure. The intention understanding unit 330 understands that, for example, intention of the text of "how is the weather tomorrow?" is "presentation of information", and a domain of a matter for which a response is desired to be provided is "weather". Further, because the "weather" is determined by a location and a date, as illustrated in FIG. 5, slots of "when" and "where" are prepared. The intention understanding unit 330 then specifies that "tomorrow" is "8/5" based on context information stored in the storage apparatus 228 for "when". Further, for "where", the intention understanding unit 330 specifies that the user lives in "Nagano" based on the user information stored in the storage apparatus 228 on the assumption that the weather at the location where the user lives is questioned. The intention structure obtained by the intention understanding unit 330 is inputted to the graph generating unit 350.

The sensor information receiving unit 340 receives a sensor value obtained by the sensor 212 as input and outputs sensor information indicating the meaning of the sensor value. This sensor information will be specifically described with reference to FIG. 6.

FIG. 6 is an explanatory diagram illustrating a specific example of the sensor information. The sensor information receiving unit 340 outputs sensor information of "user A AT-PRESENT-LOCATION north latitude 35.68, user A AT-PRESENT-LOCATION east longitude 135.77" meaning that the "user A is currently located at the north latitude of 35.68 degrees and the east longitude of 135.77 degrees" based on the sensor value from the GPS which is one example of the sensor 212. Such sensor information outputted from the sensor information receiving unit 340 is handled as part of the context information in the knowledge information.

The graph generating unit 350 receives the intention structure from the intention understanding unit 330 as input, receives the sensor information from the sensor information receiving unit 340 as input and generates a graph structure indicating linkage among a plurality of information elements having relationship with a question from the user based on the intention structure and the knowledge information (including the sensor information). For example, the graph generating unit 350 repeats specification through search of an information element by specifying a first information element corresponding to the domain understood by the intention understanding unit 330 and searching and specifying a second information element having relationship with the first information element. The generation of the graph structure will be more specifically described below with reference to FIG. 7 and FIG. 8.

Figure 8:
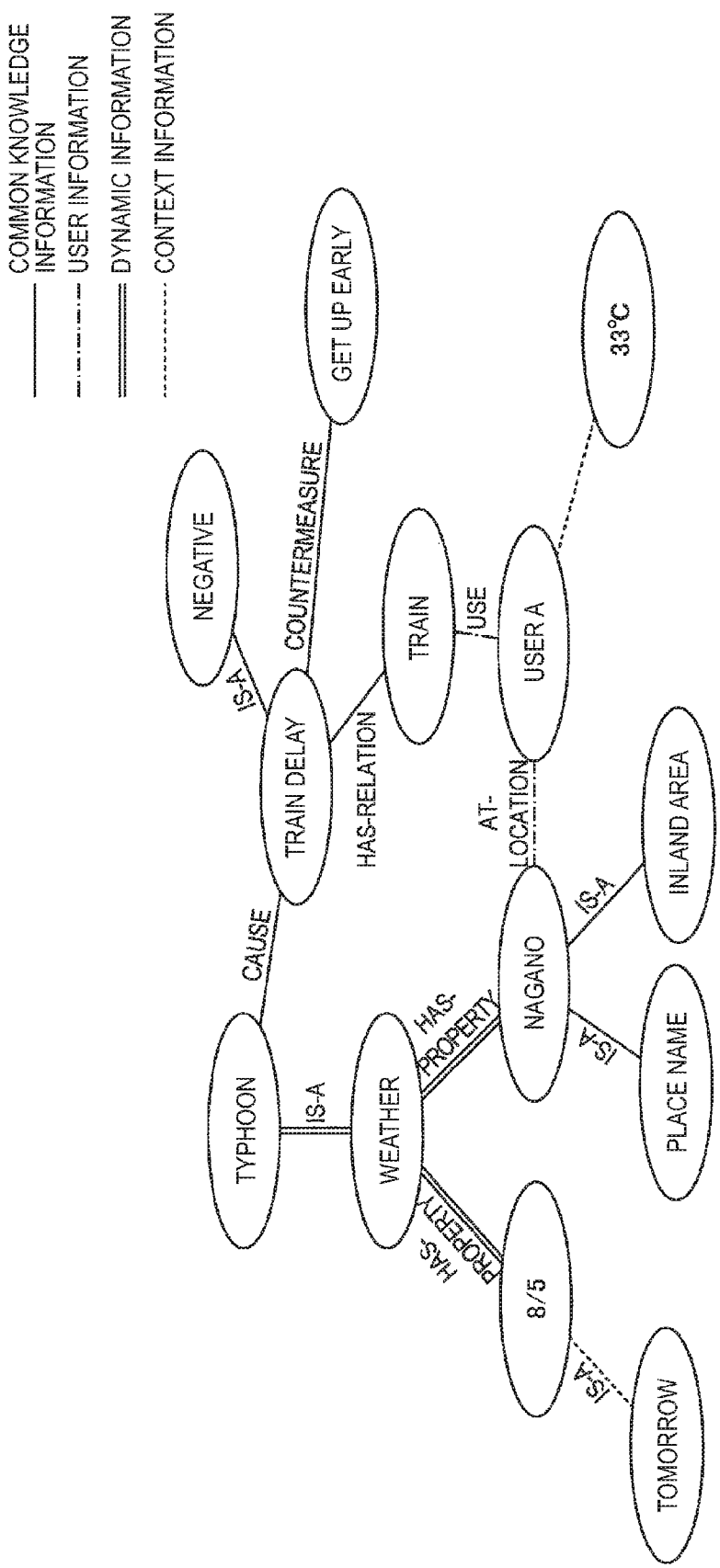
FIG. 8 is an explanatory diagram illustrating generation process of a graph structure according to an embodiment of the present disclosure.

FIG. 7 and FIG. 8 are explanatory diagrams illustrating generation process of the graph structure. First, the graph generating unit 350 generates a graph in which "tomorrow", "8/5", "weather", "Nagano" and "user A" are linked based on the intention structure. The graph generating unit 350 then specifies the "weather" having property of "8/5" and "Nagano" in the intention structure, specifies that the "weather" is associated with "typhoon" based on dynamic information of "8/5 Nagano weather typhoon" illustrated in FIG. 3, and, as illustrated in FIG. 7, adds an information element of "typhoon" as a node of the graph.

Still further, the graph generating unit 350 updates the graph structure by searching an information element having relationship with each information element included in the created graph from the knowledge information and adding the information element. For example, as illustrated in FIG. 8, the graph generating unit 350 specifies "train delay" caused due to influence of "typhoon" from the common knowledge information and links "typhoon" with "train delay". Further, the graph generating unit 350 specifies that "user A" uses "train" from the user information and links "user A" with "train". Still further, the graph generating unit 350 specifies that "train delay" is associated with "train" from the common knowledge information and links "train delay" with "train". Further, as illustrated in FIG. 8, "Nagano" is linked with "place name" and "inland area", "train delay" is linked with "negative" and "get up early", and user A is linked with "33° C.".

The information extracting unit 360 receives the graph structure generated by the graph generating unit 350 as input and extracts response basic information which is a response to the question from the graph structure. For example, the information extracting unit 360 specifies an information element corresponding to the domain understood by the intention understanding unit 330 from the graph structure and extracts an information element having predetermined relationship with the specified information element as the response basic information. In the example of the graph structure illustrated in FIG. 8, the information extracting unit 360 specifies an information element of "weather" corresponding to the domain understood by the intention understanding unit 330 and extracts "typhoon" having relationship of "IS-A" with "weather" as the response basic information.

Further, the information extracting unit 360 extracts response addition information from the graph structure according to the graph structure and a search rule set in advance. For example, the information extracting unit 360 extracts response addition information from a group of information elements linked with information elements included in the response basic information and the user information directly or via one or more information elements. More specifically, the information extracting unit 360 extracts a third information element associated with a predetermined information element and/or a fourth information element having predetermined relationship with the third information element as the response addition information. In the example illustrated in FIG. 8, the information extracting unit 360 extracts "train delay" directly associated with "negative" and "get up early" having relationship of "COUNTERMEASURE" with an event of "train delay" from the group of information elements linked with "typhoon" which is the response basic information and the information elements "user A", "train", or the like, included in the user information directly or via one or more information elements as the response addition information.

The response generating unit 370 receives the response basic information and the response addition information from the information extracting unit 360 as input and generates a response sentence based on the question from the user, the response basic information and the response addition information. For example, when "typhoon" is inputted as the response basic information, and "train delay" and "get up early" are inputted as the response addition information, the response generating unit 370 generates a response sentence of "a typhoon is coming tomorrow. As the train may be delayed, it may be better to get up early".

The sound synthesizing unit 380 receives the response sentence from the response generating unit 370 as input and generates a sound signal corresponding to the response sentence through sound synthesis. The sound signal generated by the sound synthesizing unit 380 is outputted from the sound output apparatus 240 as sound. It should be noted that an output form of the response sentence is not limited to sound output, and the output form of the response sentence may be display by the display apparatus 248.

As described above, because the information processing apparatus 20 according to the present embodiment can respond based on the response addition information in addition to the response basic information, the information processing apparatus 20 is more convenient than a system which simply responds only to the question. Further, because the information extracting unit 360 extracts an information element having relationship with the user as the response addition information, the information processing apparatus 20 according to the present embodiment can provide a response tailored to the user. Therefore, the information processing apparatus 20 according to the present embodiment can further increase user satisfaction for a response to a question.

(Supplement)

While in FIG. 8 referred to in the above description, an example has been described where only "train delay" is an information element associated with "negative", there may be a case where there are a plurality of information elements associated with "negative". A method for extracting response addition information assuming such a case will be described with reference to FIG. 9.

Figure 9:
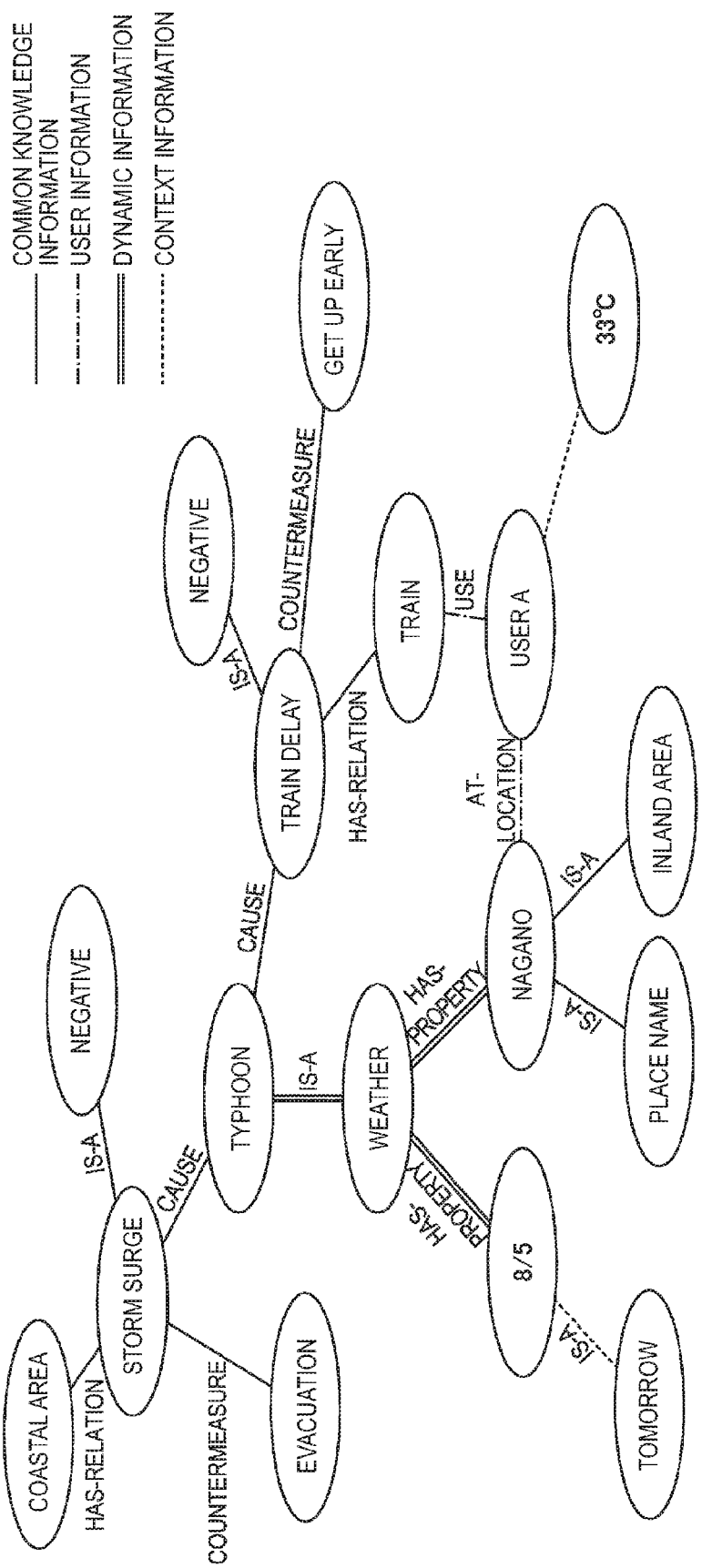
FIG. 9 is an explanatory diagram illustrating another example of the graph structure according to an embodiment of the present disclosure.

FIG. 9 is an explanatory diagram illustrating another example of the graph structure. In the graph structure illustrated in FIG. 9, in addition to "train delay", "storm surge" is also associated with "negative". In this case, the information extracting unit 360 may extract "train delay", "get up early", "storm surge" and "evacuation" as the response addition information according to a search rule for extracting information elements associated with "negative" and information elements having relationship of countermeasure with an event of the information elements.

However, for the user A who lives in Nagano which is an inland area, it can be hardly said that information such as "storm surge" and "evacuation" is beneficial. Therefore, the information extracting unit 360 may extract the response addition information from the group of information elements including information elements existing between the response basic information and the user information in the graph structure. That is, the group of information elements may be constituted with the user information, and information elements having relationship without involving the information element corresponding to the question. In this case, in the example illustrated in FIG. 9, possible information elements constituting the group of information elements include "train delay", "train", "negative" and "get up early". On the other hand, because "storm surge" and "evacuation" do not exist between the response basic information and the user information in the graph structure, "storm surge" and "evacuation" are not included in the group of information elements. Therefore, the information extracting unit 360 can extract "train delay" and "get up early" as the response addition information without extracting "storm surge" and "evacuation" as the response addition information.

Further, when a score is set for each information element, the information extracting unit 360 may extract the response addition information based on the score. That is, when the group of information elements includes a plurality of information elements associated with "negative", the information extracting unit 360 may select an information element to be extracted as the response addition information from the plurality of information elements based on the score set for each of the plurality of information elements. For example, the information extracting unit 360 may select an information element with the highest score or may preferentially select an information element with a higher score by, for example, selecting an information element with a score exceeding a threshold.

Alternatively, when the group of information elements include a plurality of information elements associated with "negative", the information extracting unit 360 may select an information element to be extracted as the response addition information from the plurality of information elements based on strength of relationship between each of the plurality of information elements and information elements included in the user information. For example, the information extracting unit 360 may preferentially select an information element liked with the information elements included in the user information via a fewer information elements from the plurality of information elements. Further, when scores are set in advance to relationship (arcs between nodes) between information elements in the graph structure, the information extracting unit 360 may preferentially select an information element with a large sum of scores of arcs existing between the plurality of information elements and the information elements included in the user information.

It should be noted that the above-described scores of the information elements and scores of the arcs may be updated according to feedback from the user. For example, when feedback indicating that the user is satisfied is sent in response to the response from the information processing apparatus 20, the control unit 260 may increase scores of the response addition information included in the response or the scores of the arcs between the response addition information and the information elements included in the user information. On the other hand, when feedback indicating that the user feels dissatisfied is sent in response to the response from the information processing apparatus 20, the control unit 260 may decrease the scores of the response addition information included in the response or the scores of the arcs between the response addition information and the information elements included in the user information. According to such a configuration, it is possible to provide a response customized to the user.

4. Operation of Information Processing Apparatus

The function of the information processing apparatus 20 according to the embodiment of the present disclosure has been described above. Subsequently, the operation of the information processing apparatus 20 according to the embodiment of the present disclosure will be organized with reference to FIG. 10.

Figure 10:
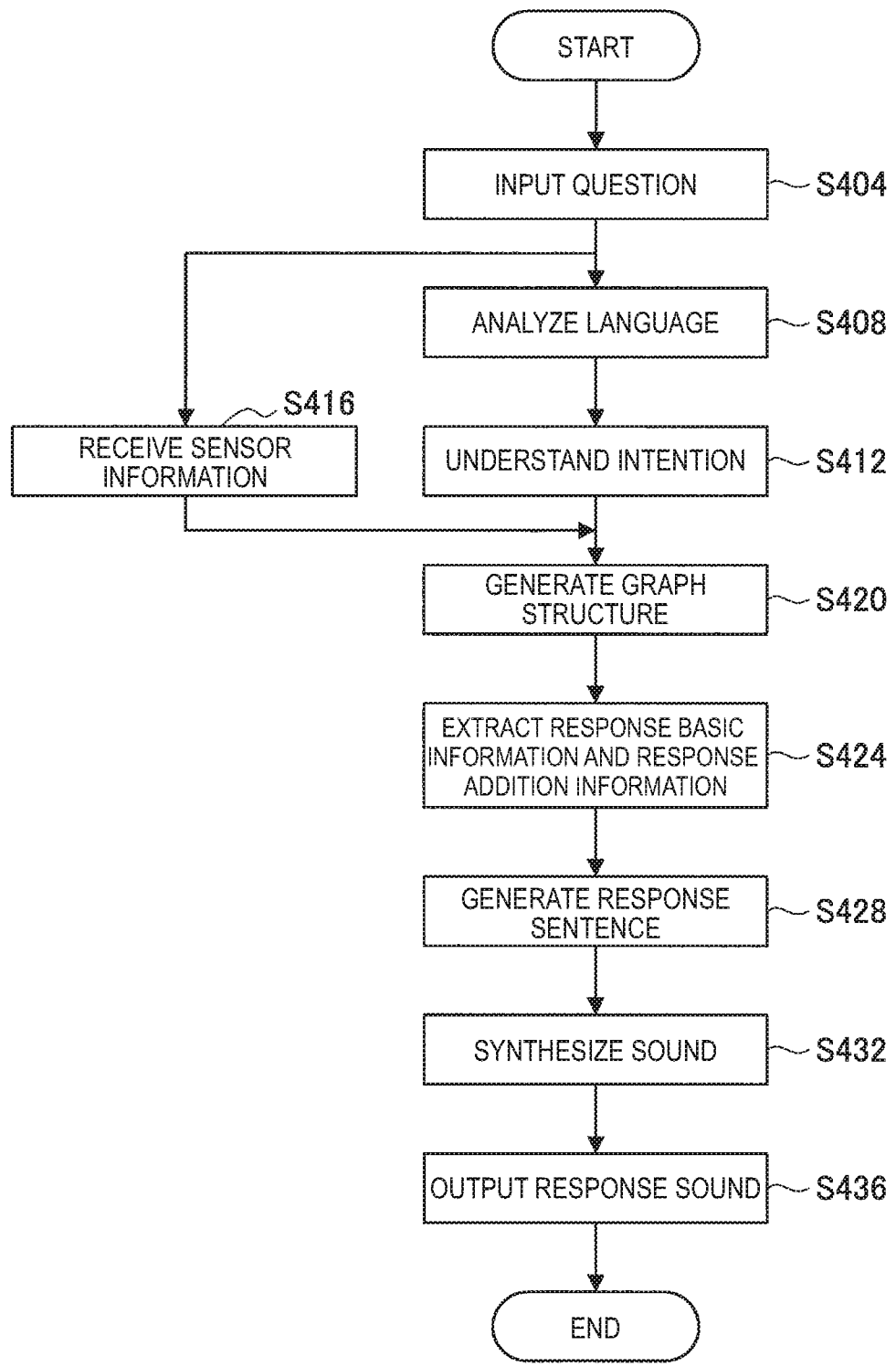
FIG. 10 is a flowchart illustrating operation of the information processing apparatus according to an embodiment of the present disclosure.

FIG. 10 is a flowchart illustrating the operation of the information processing apparatus 20 according to the embodiment of the present disclosure. As illustrated in FIG. 10, the operation of the information processing apparatus 20 according to the embodiment of the present disclosure is started by a question being inputted from the user (S404). The input of the question from the user may be sound input or text input. When the input of the question from the user is sound input, the question is converted into text by the sound recognizing unit 310 performing sound recognition.

Subsequently, the language analyzing unit 320 determines spacing, a word class of each morpheme, modification, or the like, by performing morphological analysis and parsing on the text obtained by the sound recognizing unit 310 or the text inputted to the operation apparatus 220 by the user (S408). Further, the intention understanding unit 330 generates an intention structure by understanding intention of the question using the result of analysis obtained by the language analyzing unit 320 (S412). Meanwhile, the sensor information receiving unit 340 receives a sensor value obtained by the sensor 212 as input and outputs sensor information indicating the meaning of the sensor value (S416).

Then, the graph generating unit 350 generates a graph structure indicating linkage among a plurality of information elements having relationship with the question from the user based on the intention structure and knowledge information (including the sensor information) (S420).

The information extracting unit 360 then extracts response basic information which is a response to the question from the graph structure generated by the graph generating unit 350 and response addition information from a group of information elements linked with information elements included in the response basic information and the user information directly or via one or more information elements (S424).

Subsequently, the response generating unit 370 generates a response sentence based on the response basic information and the response addition information extracted by the information extracting unit 360 (S428). Then, the sound synthesizing unit 380 generates a sound signal corresponding to the response sentence through sound synthesis (S432), and the sound output apparatus 240 outputs response sound in response to the question based on the sound signal (S436). It should be noted that when an output form of the response is display, the response sentence is displayed instead of sound synthesis being performed and response sound being outputted.

5. Application Example

The information processing apparatus 20 according to the embodiment of the present disclosure has been described above. While, in the above description, a search rule for specifying an information element associated with "negative" upon extraction of the response addition information has been described, the search rule is not limited to this example. For example, the search rule in the application example can include a search rule for extracting a fifth information element associated with "positive" from the above-described group of the information elements as the response addition information. A response example in the case where the user asks a question of "what is the schedule for tomorrow?" will be specifically described below.

FIG. 11 is an explanatory diagram illustrating an intention structure of a question of "what is the schedule for tomorrow?" obtained by the intention understanding unit 330. As illustrated in FIG. 11, the intention understanding unit 330 understands that, for example, the intention of the question of "what is the schedule for tomorrow?" is "presentation of information", and a domain of a matter for which a response is desired to be provided is "schedule". Further, because "schedule" is determined by date and time, as illustrated in FIG. 11, a slot of "when" is prepared. The intention understanding unit 330 then specifies that "tomorrow" is "8/5" based on context information stored in the storage apparatus 228 for "when".

Figure 12:
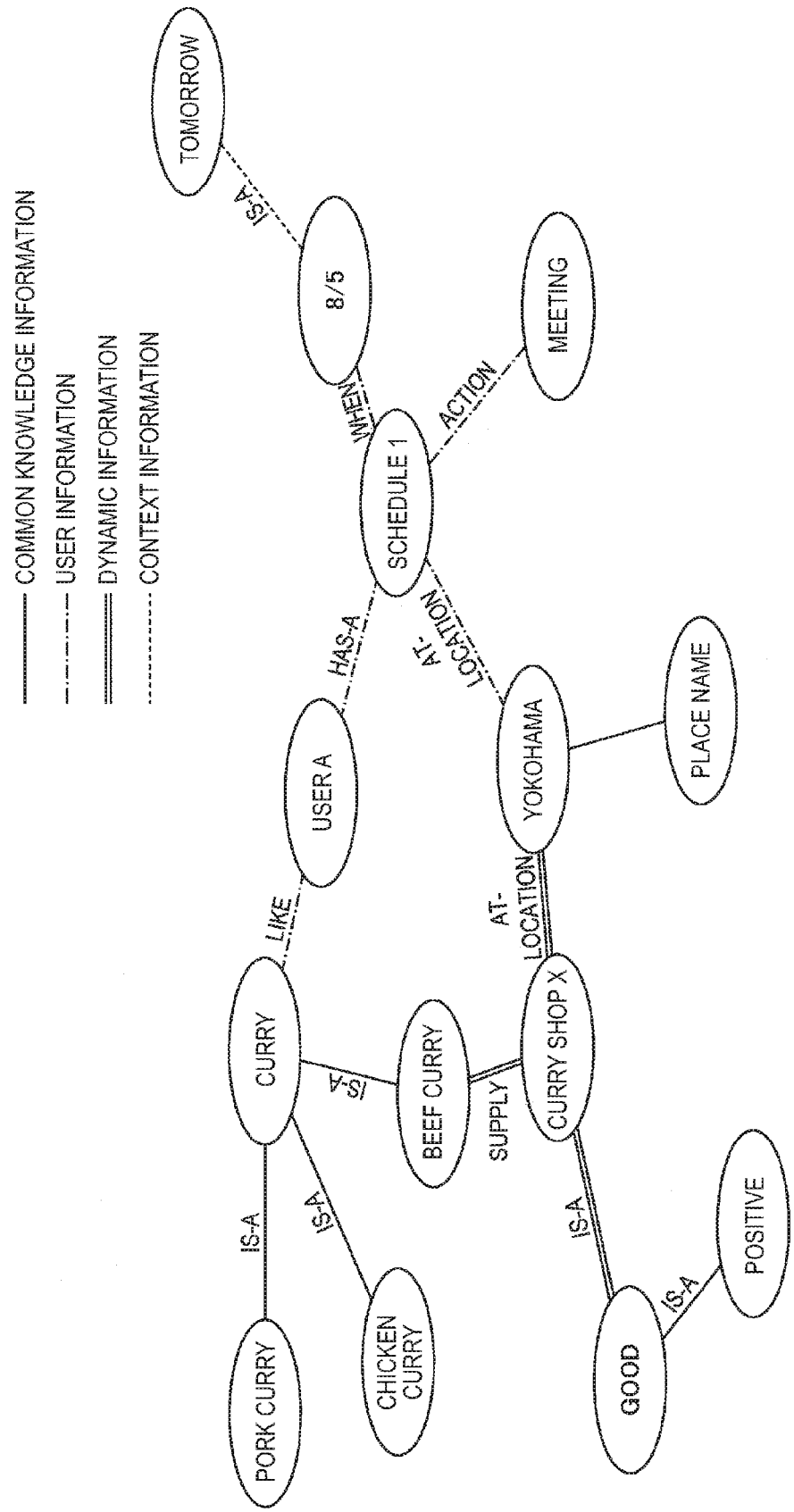
FIG. 12 is an explanatory diagram illustrating another example of the graph structure according to an embodiment of the present disclosure.

The graph generating unit 350 generates a graph structure indicating linkage among a plurality of information elements having relationship with the question from the user as illustrated in FIG. 12 based on the knowledge information and the intention structure obtained by the intention understanding unit 330. The graph structure illustrated in FIG. 12 indicates that the user A likes curry, that there is curry shop X in Yokohama, and that the curry shop X is GOOD.

The information extracting unit 360 specifies an information element of "schedule 1" corresponding to the domain understood by the intention understanding unit 330 from the graph structure illustrated in FIG. 12 and extracts "Yokohama" and "meeting" having relationship with "schedule 1" as the response basic information. Further, the information extracting unit 360 extracts "GOOD" and "curry shop X" associated with "positive" as the response addition information according to the search rule in the application example. The response generating unit 370 then generates a response sentence based on the question from the user, the response basic information and the response addition information. For example, the response generating unit 370 can create a response sentence including additional information of "there is good curry shop X in Yokohama" which may be beneficial for user A in addition to the response of "you will have a meeting in Yokohama tomorrow" to the question.

In this manner, according to the search rule in the application example, it is possible to provide a response of recommendation information relating to the response to the user in addition to the response to the question of the user. Further, it is possible to further improve depth of the response by defining various search rules.

6. Conclusion

As described above, because the information processing apparatus 20 according to the embodiment of the present disclosure provides a response of information tailored to the user in addition to the response to the question from the user, it is possible to realize a user assistance function which can provide a "smart" response to the user. The user assistance function can reduce a case where the user needs to repeat additional questions which is troublesome and can provide information beneficial for the user.

The preferred embodiment of the present disclosure has been described above with reference to the accompanying drawings, whilst the present disclosure is not limited to the above examples. A person skilled in the art may find various alterations and modifications within the scope of the appended claims, and it should be understood that they will naturally come under the technical scope of the present disclosure.

For example, while, in the above description, an example has been described where each function is implemented at the information processing apparatus 20 which is utilized by the user, part or all of the functions of the control unit 260 may be implemented on a server apparatus on the network. In this case, the information processing apparatus 20 may transmit recognized sound of the user to the server apparatus, the server apparatus may perform language analysis, intention understanding, graph generation, information extraction, response generation, sound synthesis, or the like, and transmit the response sound obtained through sound synthesis to the information processing apparatus 20, and the information processing apparatus 20 may output the response sound as sound. That is, by making the server apparatus on the network function as the information processing apparatus of the above-described embodiment, it is possible to realize cloud computing.

The steps in the processes performed by the information processing apparatus 20 in the present specification may not necessarily be processed chronologically in the orders described in the flowcharts. For example, the steps in the processes performed by the information processing apparatus 20 may be processed in different orders from the orders described in the flowcharts or may be processed in parallel.

Also, a computer program causing hardware such as the CPU 262, the ROM 264, and the RAM 266 included in the information processing apparatus 20 to carry out the equivalent functions as the above-described configuration of the information processing apparatus 20 can be generated. Also, a storage medium having the computer program stored therein can be provided.

In addition, the effects described in the present specification are merely illustrative and demonstrative, and not limitative. In other words, the technology according to the present disclosure can exhibit other effects that are evident to those skilled in the art along with or instead of the effects based on the present specification.

Additionally, the present technology may also be configured as below.

(1) An information processing apparatus including:
an intention understanding unit configured to understand intention of a question inputted from a user; and
an information extracting unit configured to extract response basic information which is a response to the question understood by the intention understanding unit and response addition information having relationship with the response basic information from a plurality of pieces of knowledge information including knowledge information relating to the user,
wherein each piece of knowledge information includes a plurality of information elements and relationship information indicating relationship among the plurality of information elements, and
wherein the information extracting unit extracts the response addition information from a group of information elements having relationship with an information element extracted as the response basic information and an information element included in the knowledge information relating to the user, directly or via one or more information elements.

(2) The information processing apparatus according to (1),
wherein the information extracting unit specifies a first information element corresponding to the question understood by the intention understanding unit and extracts a second information element as the response basic information, the second information element having relationship with the information element.

(3) The information processing apparatus according to (2),
wherein the information extracting unit extracts a fourth information element as the response addition information, the fourth information element having predetermined relationship with a third information element directly associated with a predetermined information element.

(4) The information processing apparatus according to (3),
wherein the predetermined relationship means that the third information element and the fourth information element have relationship of an event and a countermeasure to the event.

(5) The information processing apparatus according to (4),
wherein when the group of information elements includes a plurality of third information elements, the information extracting unit selects at least any of the third information elements from the plurality of third information elements based on scores set in advance to the third information elements and extracts the fourth information element having the predetermined relationship with the selected third information element as the response addition information.

(6) The information processing apparatus according to (4),
wherein when the group of the information elements includes a plurality of third information elements, the information extracting unit selects at least any of the third information elements from the plurality of third information elements based on strength of relationship between each of the plurality of third information elements and an information element included in the knowledge information relating to the user, and extracts the fourth information element having the predetermined relationship with the selected third information element as the response addition information.

(7) The information processing apparatus according to (2),
wherein the information extracting unit extracts, as the response addition information, a fifth information element associated with a predetermined information element.

(8) The information processing apparatus according to any one of (1) to (7), further including
a response generating unit configured to generate a response sentence based on the response basic information and the response addition information.

(9) The information processing apparatus according to any one of (1) to (8),
wherein the group of information elements has relationship with the information element extracted as the response basic information and an information element included in the knowledge information relating to the user, without involving an information element corresponding to the question.

(10) The information processing apparatus according to any one of (1) to (9),
wherein the knowledge information further includes at least any of common knowledge information, context information indicating an environment in which the user is located, and dynamic information indicating an event in the world.

(11) An information processing method including:
understanding intention of a question inputted from a user; and
extracting response basic information which is a response to the understood question and response addition information having relationship with the response basic information from a plurality of pieces of knowledge information including knowledge information relating to the user by a processor,
wherein each piece of knowledge information includes a plurality of information elements and relationship information indicating relationship among the plurality of information elements, and
wherein extraction of the response addition information includes extraction of the response addition information from a group of information elements having relationship with an information element extracted as the response basic information and an information element included in the knowledge information relating to the user, directly or via one or more information elements.

(12) A program causing a computer to function as an information processing apparatus including:
an intention understanding unit configured to understand intention of a question inputted from a user; and
an information extracting unit configured to extract response basic information which is a response to the question understood by the intention understanding unit and response addition information having relationship with the response basic information from a plurality of pieces of knowledge information including knowledge information relating to the user,
wherein each piece of knowledge information includes a plurality of information elements and relationship information indicating relationship among the plurality of information elements, and
wherein the information extracting unit extracts the response addition information from a group of information elements having relationship with an information element extracted as the response basic information and an information element included in the knowledge information relating to the user, directly or via one or more information elements.

REFERENCE SIGNS LIST 20 information processing apparatus
204 sound input apparatus
212 sensor
220 operation apparatus
228 storage apparatus
240 sound output apparatus
248 display apparatus
252 communication interface
260 control unit
310 sound recognizing unit
320 language analyzing unit
330 intention understanding unit
340 sensor information receiving unit
350 graph generating unit
360 information extracting unit
370 response generating unit
380 sound synthesizing unit

The invention claimed is:
1. An information processing apparatus, comprising:
at least one sensor configured to acquire environmental information;
a microphone configured to acquire a first sound signal of a user; and
a Central Processing Unit (CPU) configured to:
store, in a storage apparatus, knowledge information comprising a plurality of information elements, relationship information, and the acquired environmental information,
wherein the plurality of information elements include information relating to the user, and
wherein the relationship information indicates relationship among the plurality of information elements;
convert, based on sound recognition, the acquired first sound signal into text information;
detect a question corresponding to the first sound signal based on the text information;
detect, based on morphological analysis, intention of the detected question;
generate a graphical structure that indicates linkage among a first group of information elements, based on the detected intention of the question,
wherein each of a plurality of nodes of the graphical structure corresponds to one of the first group of information elements, and
wherein corresponding score associated with each of arcs between at least two of the plurality of nodes is set in advance;
extract response basic information which is a response to the detected question and response addition information, based on the generated graphical structure and the acquired environmental information,
wherein the response addition information has relationship with the response basic information based on the stored knowledge information,
wherein the response addition information is extracted from a second group of information elements included in the first group of information elements having relationship with a first information element extracted as the response basic information and a second information element included in the knowledge information relating to the user, based on at least one information element from the plurality of information elements,
wherein the at least one information element from the second group of information elements is selected based on strength of relationship between each of the plurality of information elements and the second information element included in the knowledge information relating to the user, and
wherein the second group of information elements lacks relationship with a third information element corresponding to the question;
output, based on sound synthesis, the extracted response basic information and the extracted response addition information as a second sound signal; and
update the corresponding score based on a user feedback on the outputted second sound signal.

2. The information processing apparatus according to claim 1, wherein the CPU is further configured to:
extract a fourth information element that is directly associated with a particular information element; and
extract a fifth information element as the response addition information,
wherein the fifth information element having a particular relationship with the extracted fourth information element.

3. The information processing apparatus according to claim 2, wherein the particular relationship means that the fourth information element and the fifth information element have relationship of an event and a countermeasure to the event.

4. The information processing apparatus according to claim 3,
wherein based on the second group of information elements that includes a plurality of fourth information elements, the CPU is further configured to:
select at least one of the plurality of fourth information elements from the plurality of fourth information elements based on scores that are set in advance for each of the plurality of fourth information elements; and
extract the fifth information element having the particular relationship with the selected at least one of the plurality of fourth information elements as the response addition information.

5. The information processing apparatus according to claim 3, wherein based on the second group of the information elements that includes a plurality of fourth information elements, the CPU is further configured to:
select at least one of the plurality of fourth information elements from the plurality of fourth information elements based on the strength of relationship between each of the plurality of fourth information elements and the second information element included in the knowledge information relating to the user; and
extract the fifth information element having the particular relationship with the selected at least one of the plurality of fourth information elements as the response addition information.

6. The information processing apparatus according to claim 1, wherein the CPU is further configured to extract, as the response addition information, a sixth information element associated with a particular information element.

7. The information processing apparatus according to claim 1, the CPU is further configured to generate a response sentence based on the response basic information and the response addition information.

8. The information processing apparatus according to claim 1, wherein the knowledge information further includes at least one of common knowledge information or dynamic information indicating an event in the world.

9. An information processing method, comprising:
acquiring environmental information from at least one sensor;
acquiring, from a microphone, a first sound signal of a user;
storing, in a storage apparatus, knowledge information comprising a plurality of information elements, relationship information, and the acquired environmental information,
wherein the plurality of information elements include information relating to the user, and
wherein the relationship information indicates relationship among the plurality of information elements;
converting, based on sound recognition, the acquired first sound signal into text information;
detecting a question corresponding to the first sound signal based on the text information;
detecting, based on morphological analysis, intention of the detected question;
generating a graphical structure that indicates linkage among a first group of information elements, based on the detected intention of the question,
wherein each of a plurality of nodes of the graphical structure corresponds to one of the first group of information elements, and
wherein corresponding score associated with each of arcs between at least two of the plurality of nodes is set in advance;
extracting response basic information which is a response to the detected question and response addition information, based on the generated graphical structure and the acquired environmental information,
wherein the response addition information has relationship with the response basic information based on the stored knowledge information,
wherein the response addition information is extracted from a second group of information elements included in the first group of information elements having relationship with a first information element extracted as the response basic information and a second information element included in the knowledge information relating to the user, based on at least one information element from the plurality of information elements,
wherein the at least one information element from the second group of information elements is selected based on strength of relationship between each of the plurality of information elements and the second information element included in the knowledge information relating to the user, and
wherein the second group of information elements lacks relationship with a third information element corresponding to the question;
outputting, based on sound synthesis, the extracted response basic information and the extracted response addition information as a second sound signal; and
updating the corresponding score based on a user feedback on the outputted second sound signal.

10. A non-transitory computer-readable medium having stored thereon computer-readable instructions, which when executed by a computer, cause the computer to execute operations, the operations comprising:
acquiring environmental information from at least one sensor;
acquiring, from a microphone, a first sound signal of a user,
storing, in a storage apparatus, knowledge information comprising a plurality of information elements, relationship information, and the acquired environmental information,
wherein the plurality of information elements include information relating to the user, and
wherein the relationship information indicates relationship among the plurality of information elements;
converting, based on sound recognition, the acquired first sound signal into text information;
detecting a question corresponding to the first sound signal based on the text information;
detecting, based on morphological analysis, intention of the detected question;
generating a graphical structure that indicates linkage among a first group of information elements, based on the detected intention of the question,
wherein each of a plurality of nodes of the graphical structure corresponds to one of the first group of information elements, and
wherein corresponding score associated with each of arcs between at least two of the plurality of nodes is set in advance;

extracting response basic information which is a response to the detected question and response addition information, based on the generated graphical structure and the acquired environmental information,
wherein the response basic information has relationship with the response basic information based on the stored knowledge information,
wherein the response addition information is extracted from a second group of information elements included in the first group of information elements having relationship with a first information element extracted as the response basic information and a second information element included in the knowledge information relating to the user, based on at least one information element from the plurality of information elements,
wherein the at least one information element from the second group of information elements is selected based on strength of relationship between each of the plurality of information elements and the second information element included in the knowledge information relating to the user, and
wherein the second group of information elements lacks relationship with a third information element corresponding to the question; and
controlling, based on sound synthesis, output of the extracted response basic information and the extracted response addition information as a second sound signal; and
updating the corresponding score based on a user feedback on the outputted second sound signal.

* * * * *